US005645395A

United States Patent [19]

Huang

[11] Patent Number: 5,645,395

[45] Date of Patent: Jul. 8, 1997

[54] BUILDING CRANE APPARATUS CLIMBABLE ON BUILDING WALLS

[76] Inventor: Hsin-Tsung Huang, P.O. Box 55-1670, Taipei (104), Taiwan

[21] Appl. No.: 467,908

[22] Filed: Jun. 6, 1995

[51] Int. Cl.$^{6}$ .............................. B66C 5/02; B65G 67/02; B65G 7/00

[52] U.S. Cl. .............................. 414/560; 215/312; 215/324; 215/199; 215/202; 52/127.1

[58] Field of Search .............................. 212/312, 199, 212/314, 324, 200, 202, 203; 414/560–561; 52/127.1, 745.2, 745.1, 745.58, 749.1

[56] References Cited

U.S. PATENT DOCUMENTS

| | | | |
|---|---|---|---|
| 3,777,900 | 12/1973 | Brewer | 212/200 |
| 3,783,792 | 1/1974 | Cullom | 212/314 |
| 3,789,565 | 2/1974 | Lindholm | 212/202 |
| 4,496,277 | 1/1985 | Jungman | 212/202 |
| 4,648,513 | 3/1987 | Greeson | 212/199 |
| 5,426,907 | 6/1995 | Franklin | 212/175 |

FOREIGN PATENT DOCUMENTS

| | | | |
|---|---|---|---|
| 612791 | 11/1960 | Italy | 212/202 |
| 248808 | 9/1994 | Japan | 52/127.1 |

*Primary Examiner*—Karen B. Merritt
*Assistant Examiner*—R. B. Johnson

[57] ABSTRACT

A building crane apparatus includes: a gantry crane slidably held on a pair of guiding rails longitudinally juxtapositionally mounted on two side walls of a building, and an elevating device secured on the building side walls for lifting the gantry crane from on the building walls to subsequently raise the crane corresponding to the building height under construction to provide a crane climbable on the building walls for eliminating an additional supporting base for erecting the crane in order for unobstructedly moving the crane in the working area.

8 Claims, 6 Drawing Sheets

BUILDING CRANE APPARATUS CLIMBABLE ON BUILDING WALLS

BACKGROUND OF THE INVENTION

A conventional tower crane as shown in FIG. 7 includes: a jib J horizontally rotatably mounted on a top portion of a lattice tower L about a slewing axis S, a trolley T slidably held on the jib J for hoisting use, a counter balance such as concrete slab W mounted on an opposite end of the trolley T, a control cabin C positioned on an upper portion of the lattice tower L, and a base B loaded with base weights and secured on a ground or floor surface.

However, such a conventional tower crane when used for the construction of a tall building may have the following drawbacks:

1. The jib J has a limited length and rotating radius about the slewing axis S, thereby limiting a working or hoisting area by the tower crane. For a larger construction site, several tower cranes must be provided to increase the construction cost.

2. The lattice tower L and the crane base B will always occupy a space within a building or in the building construction site. It requires professional skill for adjusting the height of the tower crane.

3. If the tower crane is erected within the building, a void space should be remained in the building for locating the tower crane for hoisting purpose. After completing the building construction, a further work to "re-fill" the void space in the building is required, possibly delaying the construction time schedule.

4. The crane operator should always stay in the cabin C which is located at a very high position, easily causing tiredness and danger to influence jib safety for the operator. For ensuring the safety for the operator and other workers, the labor insurance fees will be greatly increased to cause a heavy burden. The present inventor has found the drawbacks of the conventional tower crane, and invented the building crane apparatus having improvements over the conventional crane.

SUMMARY OF THE INVENTION

The object of the present invention is to provide a building crane apparatus including: a gantry crane slidably held on a pair of guiding rails longitudinally juxtapositionally mounted on two side walls of a building, and an elevating device secured on the building side walls for lifting the gantry crane directly on the building walls to subsequently raise the crane corresponding to the building height under construction to provide a crane climbable on the building walls for eliminating an additional supporting base for erecting the crane in order for unobstructedly moving the crane in the working area.

DETAILED DESCRIPTION

Figure 1:
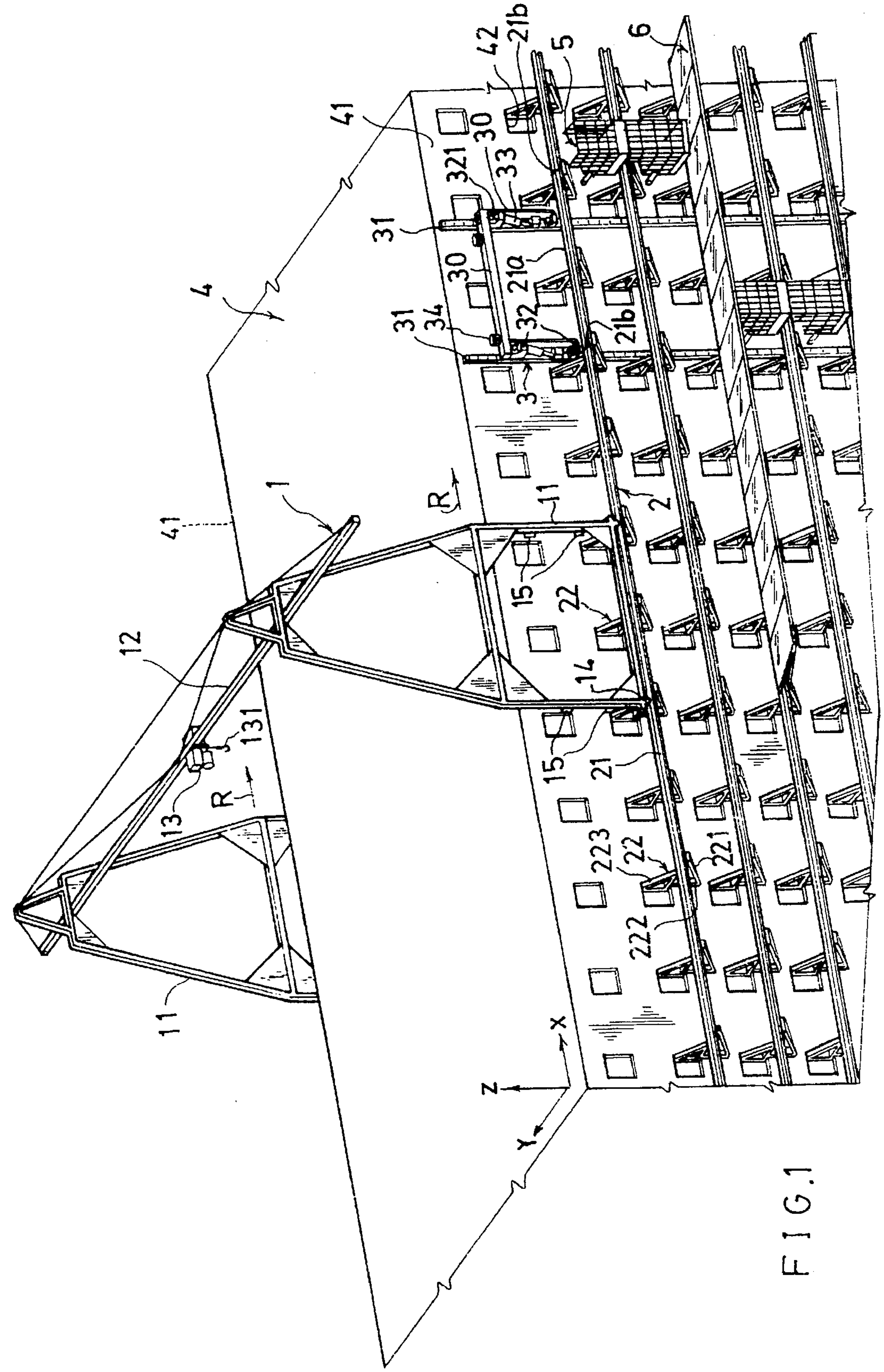
FIG. 1 is a perspective illustration of the present invention when used in a building construction.

As shown in FIGS. 1–6, the present invention comprises: a crane means 1, a base rail means 2 secured on two walls 41 of a building 4, and a pair of elevating means 3 each mounted on each wall 41 of the building 4 for raising the crane means 1 from the wall 41 of the building 4.

The base rail means 2 is supported on a plurality of brackets 22, each bracket 22 securable on a frame of a window or a wall opening 42 formed in the side wall 41 of the building 4.

A plurality of cages 5 may be mounted or slidably mounted on the rail means 2 for wall finishing such as fixing of tiles on the wall 41 and a plurality of guard boards 6 which may be inclinedly secured on the rail means 2 after the crane means 1 is upwardly moved on the side walls 41 and before the rail means 2 is dismantled.

The shapes and structures of the cage 5 and the guard board 6 are not limited in this invention.

The crane means 1 includes: a pair of gantry stands 11 disposed on two walls 41 of the building 4 each stand 11 having a roller means 14 secured in a bottom groove 16 recessed in a bottom of each stand 11 to be engageable with a guiding rail 21 of the base rail means 2, a girder 12 transversely connected between the two gantry stands 11 and horizontally positioned at an upper portion of the crane means 1, a trolley 13 having a hoisting unit 131 provided on the trolley 13 slidably held on the girder 12 for hoisting purpose, and at least one catching member 15 formed on an inside surface of each gantry stand 11 and engageable with a coupling head portion 321 of a lifting elbow member 32 of the elevating means 3 to be lifted by the elbow member 32 of the elevating means 3.

The base rail means 2 includes: a pair of rails 21 longitudinally disposed on the two walls 41 of the building 4, each rail 21, which may be made of I beam, defining a rail axis 20 at a longitudinal center of each rail 21 and having horizontal track 210 on an upper portion of the rail 21 for rotatably engaging the roller means 14 of the crane means 1, and a plurality of brackets 22 longitudinally distributed and secured on each side wall 41 of the building 4 for fixing each rail 21 on each bracket 22 by fixing bolts 211.

The roller means 14 of the crane means 1 includes: a plurality of tracking rollers 141 running on each rail 21, a driving motor 142 for driving at least one tracking roller 141 by guarded chain or belt for moving the gantry stand 11 of the crane means i on the rail means 2, and a plurality of pairs of guard rollers 143 rotatably mounted in the bottom groove 16 of the gantry stand 11 each pair of guard rollers 143 transverse to the rail axis 20 and disposed on two opposite sides of a bottom portion of the track 210 for stabilizing the rolling movement of the gantry stand on the guiding rail 21, and at least a scraper 144*a* (FIG. 2) secured on the bottom of the gantry stand 11 for scraping dirts or clay on the rail 21 when moving the stand 11 on the rail 21.

Each bracket 22 includes: a horizontal platform 221 for fixing each rail 21 thereon by bolts 211, a lower brace 222 secured on the side wall 41 of the building 4 preferably secured to a ledge of a window or wall opening 42 for supporting the horizontal platform 221, and an upper fastener 223 securing the horizontal platform 221 to an upper frame of the window or wall opening 42, thereby stably fixing each bracket 22 on the side wall 41 of the building 4.

Figure 3:
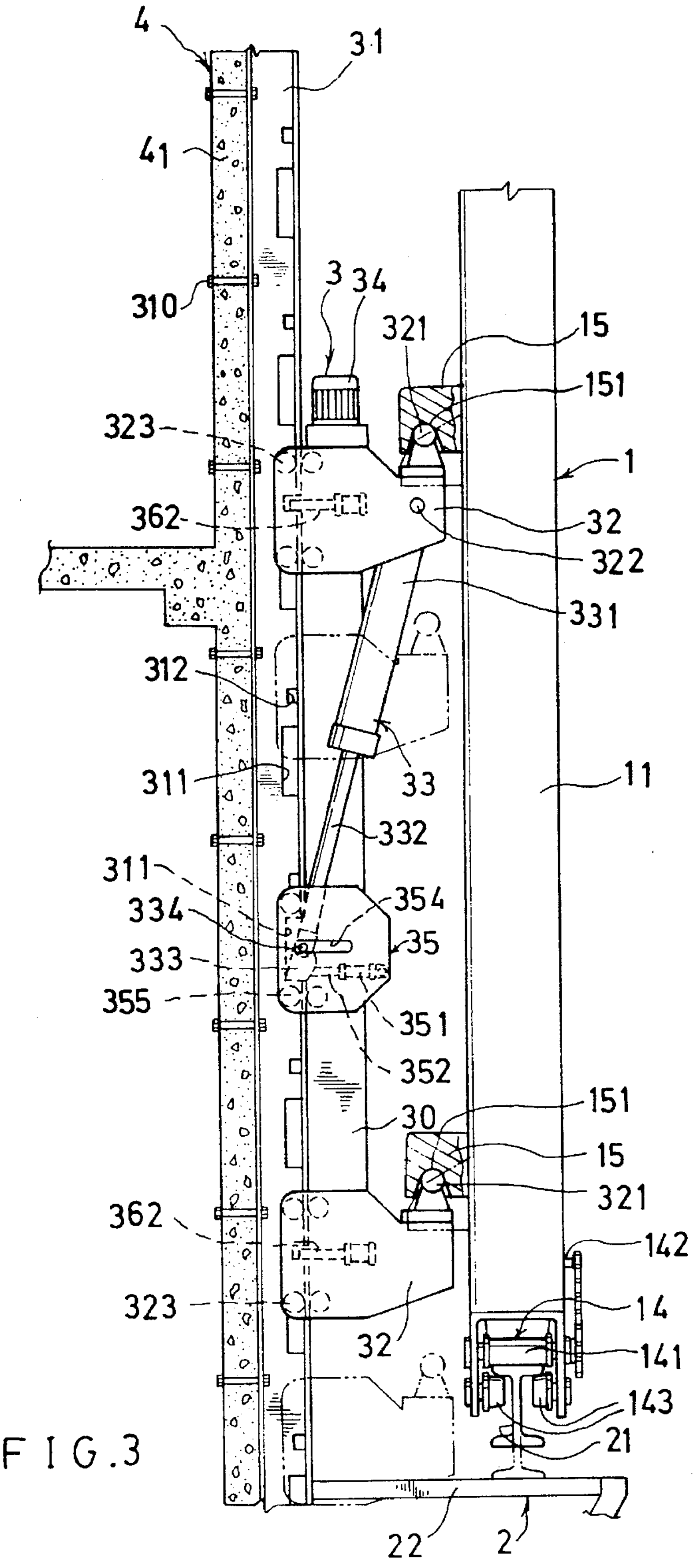
FIG. 3 is an illustration showing the elevating means for lifting the crane means of the present invention.

The rail 21 includes a rail section 21*a* detachably mounted on at least two brackets 22 separately disposed on the elevating means 3, and having two opposite free rail ends 21*b* of the rail section 21*a* forming a partial section of the rail 21, to be linearly continuously connected with the other rail portion of the rail 21 so that the roller means 14 of the gantry stand 11 may be guided on the rail 21 and the crane means 1 may be moved towards the rail section 21*a* in direction R as shown in to be lifted by the elevating means 3 as shown in FIGS. 1 and 3 when it is intended to raise the crane means 1.

The pair of elevating means 3 respectively lift the two gantry stands 11 of the crane means 1.

Each elevating means 3 includes: a pair of vertical columns 31 parallelly vertically secured by fixing bolts 310 on each wall 41 of the building 4, at least a pair of lifting elbow members 32 transversely secured on two opposite end portions of a lifting frame 30 for lifting each catching member 15 formed on each gantry stand 11 of the crane means 1, a pair of climbing leg members 33 each pivotally secured to each lifting elbow member 32 and normally inclinedly supported on each vertical column 31 and operatively extended as driven by a pair of driving means 34 secured on the lifting frame 30 a locking means 36 normally locking each lifting elbow member 32 on each vertical column 31, and a leg controller 35 for locking and unlocking the climbing leg member 33 on and from the vertical column 31, whereby upon an extending of the climbing leg member to raise the lifting elbow member 32, the gantry stand 11, with the catching member 15 engaged with the lifting elbow member 32, will be lifted to raise the crane means 1 corresponding to the rising of the building 4 under construction, Each lifting elbow member 32 includes: a head portion 321 formed on an outer upper portion of the elbow member 32 to be engageable with a socket 151 recessed in a bottom of each catching member 15 formed on the gantry stand 11 of the crane means 1, a shaft 322 transversely secured in an outer portion of the elbow member 32 for pivotally connecting an upper portion of the climbing leg member 33, a plurality of guiding rollers 323 rotatably mounted on an inner portion of the elbow member 32 to be slidably engageable with the vertical column 31, and a bolt sleeve 324 for slidably holding a locking bolt 362 of the locking means 36 with the locking bolt 362 operatively driven by a locking cylinder 361 which may be made of a hydraulic cylinder of the locking means 36 or other locking driving system for an insertion of the locking bolt 362 into a bolt hole 312 longitudinally notched in and equally spaced on the vertical column 31 for stably locking each elbow member 32 on the vertical column 31 when normally rolling the gantry stands 11 of the crane means 1 on the rails 21 along a X-axis of the three dimensional coordinates such as X, Y, Z axes as shown in FIG. 1.

The climbing leg member 33 includes: a leg cylinder 331 pivotally secured with the lifting elbow member 32 by a shaft 322 and driven by the driving means 34 which may be a hydraulic pump or driving motor, a plunger rod 332 telescopically held in the leg cylinder 331, and a foot member 333 connected to a lower end portion of the plunger rod 332 by a rod pin 334, with the foot member 333 pivotally connected to a leg controller 35 which is slidably held on the vertical column 31 and with the foot member 333 lockable on a foot notch 311 of a plurality of foot notches 331 longitudinally slotted in and equally spaced on the vertical column 31.

The leg controller 35 includes: a foot cylinder 351 pivotally secured to a controller box 350 having a plurality of controller guiding rollers 355 rotatably mounted in an inner portion of the controller box 350 to be slidably engageable with the vertical column 31, an actuating link 352 reciprocatively held in the foot cylinder 351 as driven by a controller driving system (not shown) and pivotally connected to the foot member 333 by a foot pivot 353, whereby upon retraction of the actuating link 352 to unlock the foot member 333 from the foot notch 311 by slidably engaging the rod pivot 334 of the foot member 333 with a slot 354 cut in the controller box 350.

During a normal operation of the crane means 1, the gantry stands 11 with the roller means 14 will roll on the two rails 21 for a X-axis movement, while the trolley 13 may be moved along the girder 12 for a Y-axis movement for hoisting operation.

The head portion 321 of each elbow member 32 should be normally positioned below the catching member 15 on the gantry stand 11 (dotted line of FIG. 3) for free sliding movement of the gantry roller units 14 on the rails 21 to prevent collision between the elbow member 32 and the catching member 15 during the movement along X and Y axes.

When it is intended to raise the crane means 1 corresponding to the rising of the building under construction, the crane means 1 is moved to approximate the elevating means 3 to be ready for lifting by the lifting elbow members 32.

Figure 2:
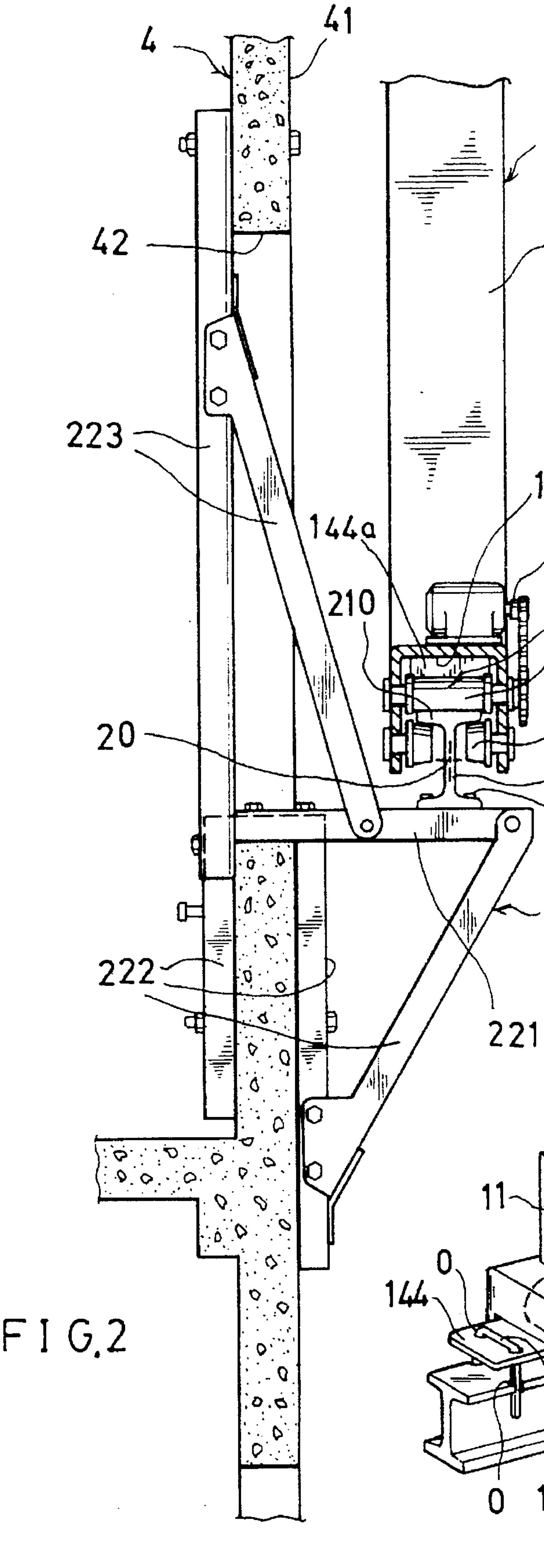
FIG. 2 is a side view illustration of the base rail means and the supporting bracket on a building wall in accordance with the present invention.
Figure 2A:
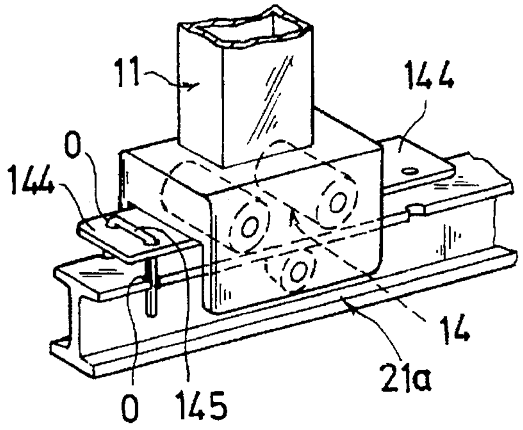
FIG. 2A shows a locking of the crane roller means with the rail section.
Figure 4:
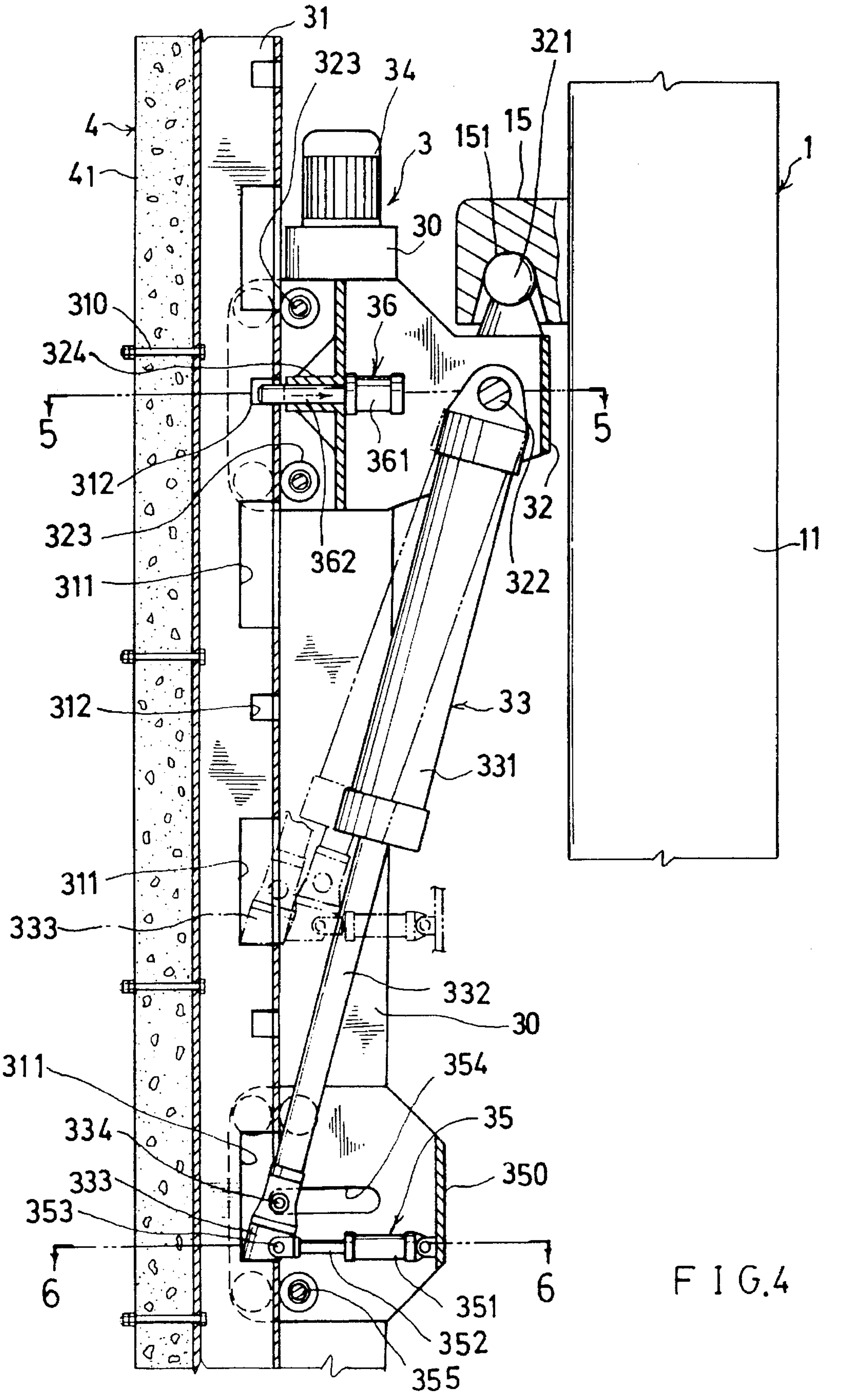
FIG. 4 is a partial enlarged view of the elevating means as shown in FIG. 3.
Figure 5:
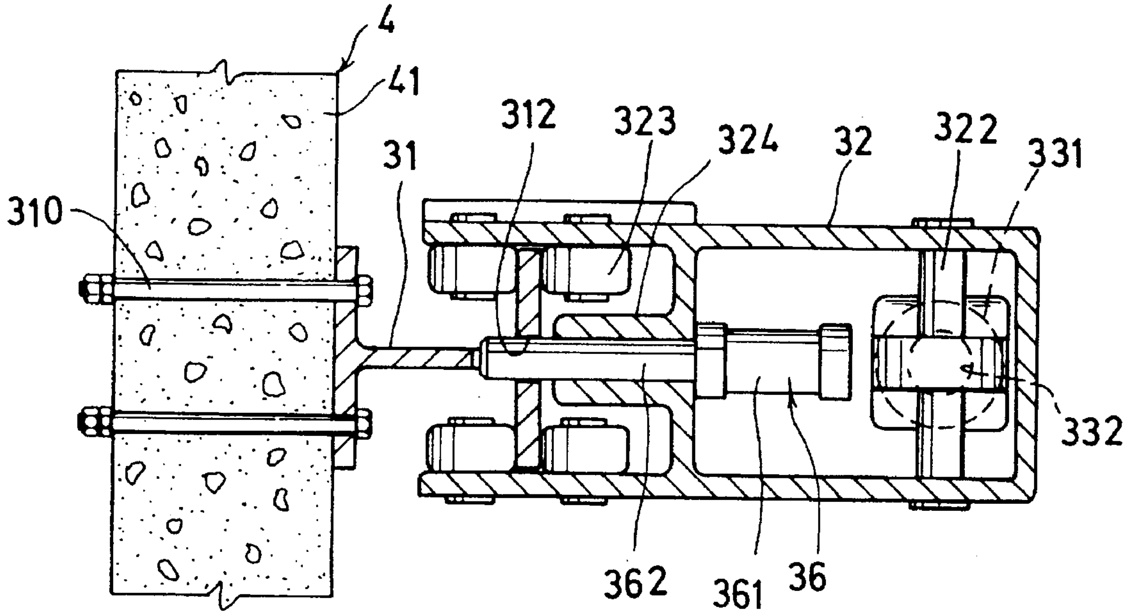
FIG. 5 is a cross sectional drawing of the present invention when viewed from 5—5 direction of FIG. 4.
Figure 6:
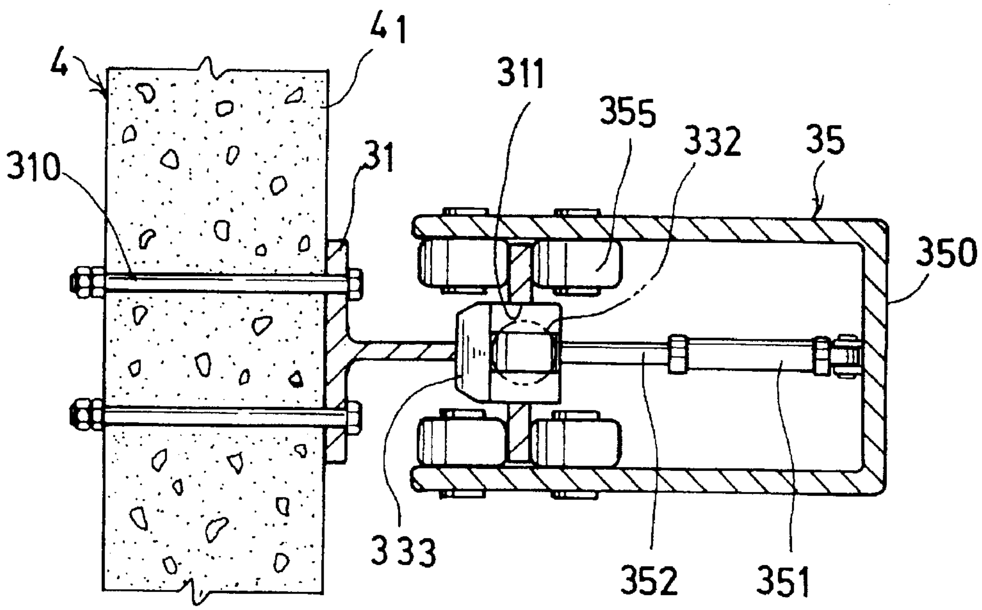
FIG. 6 is a cross sectional drawing when viewed from 6—6 direction of FIG. 4.
Figure 7:
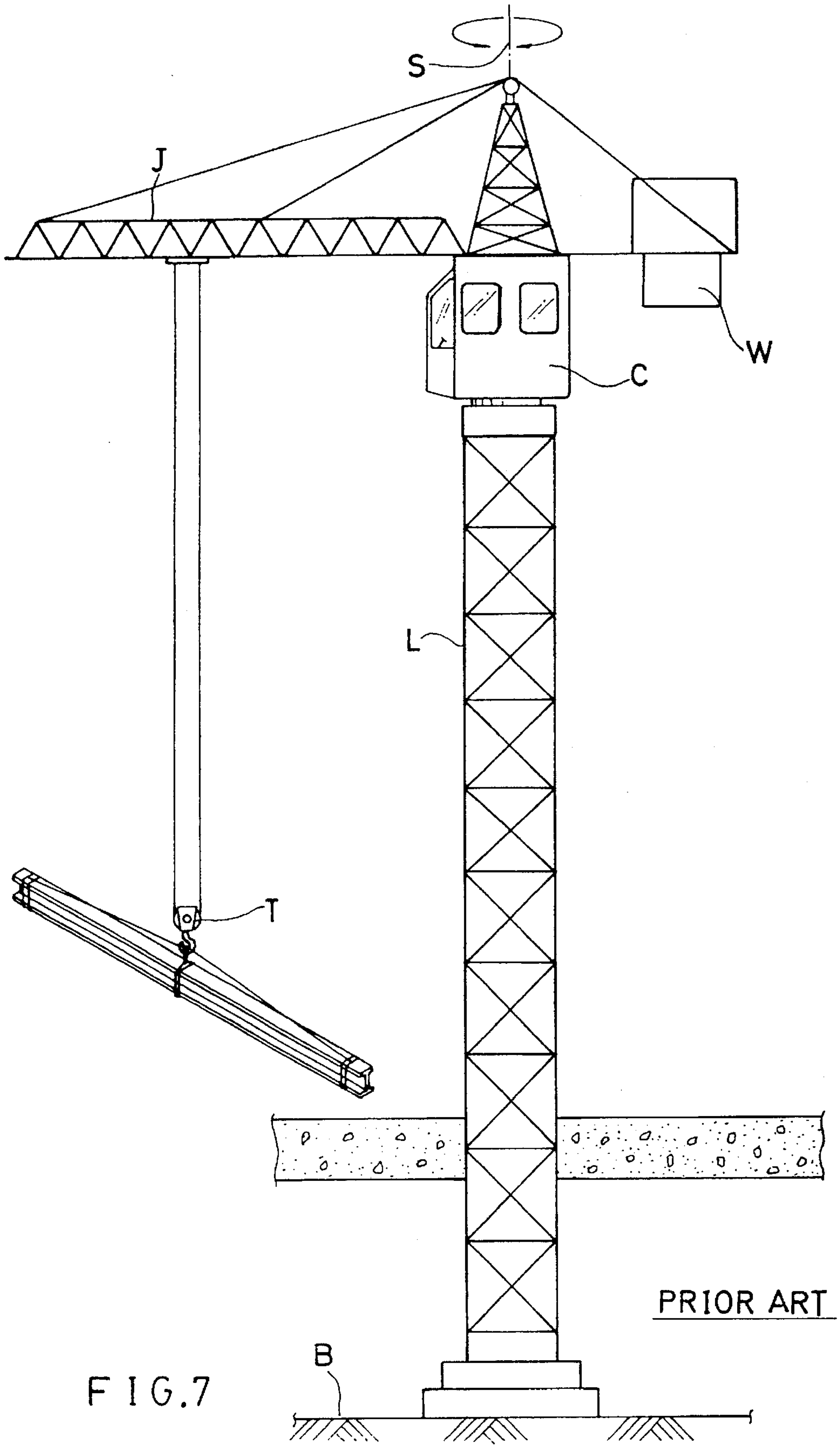
FIG. 7 shows a conventional tower crane.

The foot member 333 of the climbing leg member 33 is first unlocked from each foot notch 311 and the plunger rod 332 is retracted into the cylinder 331 as shown in dotted line of FIG. 4 to "climb" the leg member 33 upwardly. The leg controller 35 is then operated to extend the foot member 333 until stably locking in the notch 311, and the elbow members 32 may be unlocked by withdrawing the bolts 362 from the bolt holes 312 in vertical column 31. The rail section 21*a* may be unlocked the from the brackets 22 ready for a lifting along with the roller means 14 of the crane means 1. A locking device such as a U-shaped shackle 145 as shown in FIG. 2A may be provided to engage the shackle openings "O" formed in a tab 144 of the roller means 14 and the rail section 21*a* for preventing sliding of the crane from the rail when raising the crane.

By boosting the cylinder 331 to extend the plunger rod 332 against the foot notch 311, the cylinder 331 and the elbow member 32 will be raised to allow the coupling head portion 321 to lift each catching member 15 on the gantry stand 11, thereby raising the crane means 1 upwardly (Z-axis) to a next higher position such as a higher story. The rail section 21*a* is previously engaged by the roller means 14 of the gantry stand 11 and will be simultaneously raised upwardly. A new guiding rail 21 should be then constructed at the upper new story to allow the sliding movement of the gantry stands 11 on the rails 21. Naturally, the elbow members 32 should then be lowered below the catching members 15 without obstructing the sliding of the gantry stand 11. The elbow members 32 are each locked on the column 31 by the locking bolts 362.

For descending the crane after completing the construction and hoisting job, the above-mentioned elevating procedures may be reversed for lowering the crane 1 which may then be dismantled. The rails may also be dismantled and hoisted by another mechanism.

The present invention may be modified without departing from the spirit and scope of this invention. A loading platform (not shown) may be secured on a suitable position of the elevating means 3 for loading some articles used in the construction site to be lifted or lowered by the elevating means 3.

The present invention is superior to the conventional tower crane with the following advantage:

1. The crane may be moved in wider area and varied orientations at X, Y, Z axes without obstruction for increasing hoisting and construction efficiency, decreasing cost, and shortening the construction time.

2. Only one set of crane apparatus is enough for a building for saving installation and investment cost since the crane may be free moved to cover the whole area of the building floor.

3. The gantry stands 11 are disposed on the side walls 41 of the building without requiring a space for installing the crane base or lattice tower. Therefore, to refill the space occupied by the conventional crane tower may be omitted for saving cost.

4. The crane operator on the controller may stand at any location, not necessary to sit in a tiny cabin at a high and dangerous position.

5. More construction jobs can be done, such as, far an automatic grouting by carrying a concrete-delivery hose on the trolley 13 for a wider area free movement of the grouting operation on the building floor; for a wall finishing such as by fixing tiles on the wall by slidably mounting the cages 5 on the rails at stories lower than the gantry stands 11; or for mounting inclined guard boards 6 on the rails for collecting falling objects from the building for safety purpose.

I claim:

1. A crane apparatus comprising:

a crane means slidably held on a base rail means mounted on a building, said crane means including a pair of gantry stands disposed on two walls of the building each said stand having a roller means secured in a bottom groove recessed in a bottom of each said stand to be engageable with a rail of the base rail means, a girder transversely connected between the two gantry stands and horizontally positioned at an upper portion of the crane means, a trolley having a hoisting unit provided on the trolley slidably held on the girder for hoisting purpose, and at least one catching member formed on an inside surface of each said gantry stand and engageable with a head portion of a lifting elbow member of the elevating means to be lifted by the elbow member of the elevating means; said base rail means including a pair of rails longitudinally disposed on the two walls of the building, each said rail defining a rail axis at a longitudinal center of each said rail and having a horizontal track on an upper portion of the rail for rotatably engaging the roller means of the crane means, and a plurality of brackets longitudinally distributed and secured on each said wall of the building for fixing each said rail on each said bracket; and a pair of elevating means fixed on the building and operatively lifting the crane means from a low standing position of the building to a high standing position of the building, each said elevating means including a pair of vertical columns parallelly vertically secured on each said wall of the building, at least a pair of lifting elbow members transversely secured on two opposite end portions of a frame for lifting each said catching member formed on each said gantry stand of the crane means, a pair of climbing leg members, each said leg member pivotally secured to each said lifting elbow member and normally inclinedly supported on each said vertical column and operatively extended as driven by a pair of driving means secured on the frame, a locking means normally locking each said lifting elbow member on each said vertical column, and a leg controller for locking and unlocking the climbing leg member on and from the vertical column, whereby upon an extending of the climbing leg member to raise the lifting elbow member, the gantry stand with the catching member engaged with the lifting elbow member will be lifted to raise the crane means corresponding to the rising of the building under construction.

2. A crane apparatus according to claim 1, wherein said roller means of the crane means includes: a plurality of tracking rollers running on each said rail, a driving motor for driving at least one said tracking roller for moving the gantry stand of the crane means on the rail means, and a plurality of pairs of guard rollers rotatably mounted in a bottom of the gantry stand each said pair of guard rollers transverse to the rail axis and disposed on two opposite sides of a bottom of the track for stabilizing the rolling movement of the gantry stand on the rail, and at least a scraper secured on the bottom of the gantry stand for scraping dirts adhered on said rail when moving said gantry stand on said rail.

3. A crane apparatus according to claim 1, wherein said bracket includes: a horizontal platform for fixing each said rail thereon, a lower brace secured on the wall adjacent to a wall opening of the building for supporting the horizontal platform, and an upper fastener securing the horizontal platform to an upper frame of the wall opening.

4. A crane apparatus according to claim 1, wherein said rail includes a rail section detachably mounted on at least two brackets separately disposed on the elevating means, and having two opposite free rail ends of the rail section forming a partial section of the rail to be linearly continuously connected with a remaining portion of the rail.

5. A crane apparatus according to claim 1, wherein each said lifting elbow member includes: a head portion formed on an outer upper portion of the elbow member to be engageable with a socket recessed in a bottom of each said catching member formed on the gantry stand of the crane means, a shaft transversely secured in an outer portion of the elbow member for pivotally connecting an upper portion of the climbing leg member, a plurality of guiding rollers rotatably mounted on an inner portion of the elbow member to be slidably engageable with the vertical column, and a bolt sleeve secured on the elbow member for slidably holding a locking bolt of the locking means with the locking bolt operatively driven by a locking cylinder as driven by a locking driving system for an insertion of the locking bolt into a bolt hole with a plurality of said bolt holes longitudinally notched in and equally spaced on the vertical column for stably locking each said elbow member on the vertical column when normally rolling the gantry stands of the crane means on the rails.

6. A crane apparatus according to claim 5, wherein said climbing leg member includes: a leg cylinder pivotally secured with the lifting elbow member and driven by the driving means, a plunger rod telescopically held in the leg cylinder, and a foot member connected to a lower end portion of the plunger rod by a rod pin, with the foot member pivotally connected to a leg controller which is slidably held on the vertical column and with the foot member lockable on a foot notch with a plurality of said foot notches longitudinally slotted in and equally spaced on the vertical column.

7. A crane apparatus according to claim 6, wherein said leg controller includes: a foot cylinder pivotally secured to a controller box having a plurality of controller guiding rollers rotatably mounted in an inner portion on the controller box to be slidably engageable with the vertical column, an actuating link reciprocatively held in the foot cylinder driven by a controller driving system and pivotally connected to the foot member by a foot pivot, whereby upon retraction of the actuating link to unlock the foot member from the foot notch by slidably engaging the rod pivot of the foot member along a slot cut in the controller box.

8. A crane apparatus according to claim 1, wherein said elevating means includes a platform secured thereon for hoisting an article as loaded on said platform of said elevating means.

* * * * *